(12) United States Patent
Little et al.

(10) Patent No.: US 8,090,107 B2
(45) Date of Patent: Jan. 3, 2012

(54) KEY AGREEMENT AND RE-KEYING OVER A BIDIRECTIONAL COMMUNICATION PATH

(75) Inventors: Herbert Anthony Little, Waterloo (CA); Michael Kenneth Brown, Fergus (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/973,485

(22) Filed: Dec. 20, 2010

(65) Prior Publication Data

US 2011/0103588 A1    May 5, 2011

Related U.S. Application Data

(63) Continuation of application No. 11/093,954, filed on Mar. 30, 2005, now Pat. No. 7,885,411.

(60) Provisional application No. 60/559,092, filed on Apr. 2, 2004, provisional application No. 60/559,646, filed on Apr. 5, 2004.

(51) Int. Cl.
*H04L 9/00*    (2006.01)
(52) U.S. Cl. ............................................. 380/277
(58) Field of Classification Search .................. 380/277, 380/247; 713/182
See application file for complete search history.

(56) References Cited

U.S. PATENT DOCUMENTS

| | | | |
|---|---|---|---|
| 5,491,750 A | 2/1996 | Bellare et al. |
| 6,091,820 A | 7/2000 | Aziz |
| 6,219,421 B1 | 4/2001 | Backal |
| 6,530,020 B1 | 3/2003 | Aoki |
| 6,718,467 B1 | 4/2004 | Trostle |
| 6,934,392 B1 | 8/2005 | Vanstone et al. |
| 7,181,014 B1 | 2/2007 | Srivastava |
| 7,328,282 B2 | 2/2008 | Ganesan et al. |
| 7,382,882 B1 | 6/2008 | Immonen |
| 2001/0016908 A1 | 8/2001 | Blake-Wilson et al. |
| 2002/0126850 A1 | 9/2002 | Allen et al. |

(Continued)

FOREIGN PATENT DOCUMENTS

CA    2241705    12/1999

(Continued)

OTHER PUBLICATIONS

Japan Patent Office First Exam Report for JP2007-505347, Apr. 7, 2010.

(Continued)

*Primary Examiner* — Ellen Tran
(74) *Attorney, Agent, or Firm* — Integral Intellectual Property Inc.; Miriam Paton

(57) ABSTRACT

A key agreement method is carried out by a first system in conjunction with a second system over a bidirectional communication path, including generating a first key pair having a first public key and a first private key, sending the first public key to the second system, receiving a second public key generated by the second system, and calculating a master key based upon the first private key, the second public key, a long-term private key, and a long-term public key. The long-term private key was generated by the first system during a previous key-agreement method as part of a long-term key pair. The long-term public key was generated by the second system and received during the previous key-agreement method. The previous key-agreement method required a secret to be known to the first system and the second system, thus conferring authentication based on the secret to the long-term public key.

21 Claims, 9 Drawing Sheets

U.S. PATENT DOCUMENTS

| | | |
|---|---|---|
| 2003/0026433 A1 | 2/2003 | Matt |
| 2003/0110372 A1 | 6/2003 | Proudler |
| 2003/0123668 A1 | 7/2003 | Lambert et al. |
| 2004/0073795 A1 | 4/2004 | Jablon |
| 2007/0022058 A1 | 1/2007 | Labrou et al. |

FOREIGN PATENT DOCUMENTS

| | | |
|---|---|---|
| CA | 2277633 | 10/2009 |
| EP | 0661844 | 7/1995 |
| EP | 0739106 | 10/1996 |
| JP | 2001117660 | 4/2001 |
| JP | 2002330125 | 11/2002 |
| WO | 9818234 | 4/1998 |
| WO | 9922485 | 5/1999 |
| WO | 9925092 | 5/1999 |
| WO | 0001109 | 1/2000 |
| WO | 0035223 | 6/2000 |
| WO | 0106697 | 1/2001 |
| WO | 02084975 | 10/2002 |
| WO | 02086684 | 10/2002 |

OTHER PUBLICATIONS

Patent Examiner First Examination report for KR 10-2006-7022804, Sep. 19, 2007.

Patent Examiner Second office action for KR 10-2006-7022804, Apr. 22, 2008.

Apostolescu, Radu Second Exam Report for EP 05729970.3, Sep. 4, 2007.

Apostolescu, Radu Third Exam Report for EP 05729970.3, Jun. 11, 2008.

Ateniese, Giuseppe "New Multiparty Authentication Services and Key Agreement Protocols", IEEE Journal on selected areas in communication, vol. 18, No. 4 Apr. 2000.

Blake-Wilson, Simon "Authenticated Diffie-Hellman Key Agreement Protocol", 5th Annual International Workshop. SAC '98 Proceedings, LNCS 1556, Springer-Verlag, issued in 1999, pp. 339-361 1999.

Boyd, Colin "Design and Analysis of Key Exchange Protocols via Secure Channel Identification", University of Manchester Nov. 28, 1994.

Certicom Corp., Code and Cipher, vol. 1, No. 2, 2003.

Engel, Lawrence J. First Office Action for CA 2,561,796, Mar. 11, 2010.

Engel, Lawrence J. Second Office Action for CA 2,561,796, Aug. 31, 2010.

Jablon, David P. "Strong Password-Only Authenticated Key Exchange", Computer Communication Review, ACM, New York, vol. 26, No. 5 pp. 5-26 ISSN 0146-4833, Sep. 25, 1996.

Langford, Susan K. "Weaknesses in Some Threshold Cryptosystems", Atalla Corporation, San Jose, California Aug. 18, 1996.

Law, Laurie "An Efficient Protocol for Authenticated Key Agreement", 1998.

Matsudaira, Akira Second Office Action for JP 2007-505347, Nov. 10, 2010.

Menezes, A. "Handbook of Applied Cryptography", CRC press, pp. 570-572 1997.

Menezes, A. "Handbook of Appliend Cryptography", Chapter 10, CRC Press 1996.

Steiner, Michael "Cliques: A New Approach to Group Key Agreement", IEEE May 1998.

Tran, Ellen C. Notice of Allowance for U.S. Appl. No. 11/093,954, Oct. 4, 2010.

Van Oorschot, Paul C. "Authentication and Authenticated Key Exchanges", Kluwer Academic Publishers, Netherlands Mar 6, 1992.

Zhang, Muxiang "Analysis of the SPEKE Password-Authenticated Key Exchange Protocol", IEEE Communication Letters, vol. 8, No. 1 pp. 63-65 Jan. 2004.

Zhen, Hao Second Office Action for CN200580017552.2, Jan. 29, 2010.

Zhen, Hao First Office Action for CN200580017552.2, May 22, 2009.

Engel, Lawrence J., Third Office Action for CA 2,561,796, Apr. 28, 2011.

KEY AGREEMENT AND RE-KEYING OVER A BIDIRECTIONAL COMMUNICATION PATH

CROSS-REFERENCE TO RELATED APPLICATIONS

This application is a continuation of U.S. patent application Ser. No. 11/093,954 filed Mar. 30, 2005, now U.S. Pat. No. 7,885,411 which will issue on Feb. 8, 2011 as U.S. Pat. No. 7,885,411, and which claims the benefit of U.S. Provisional Application No. 60/559,092 filed Apr. 2, 2004 and of U.S. Provisional Application No. 60/559,646 filed Apr. 5, 2004, the contents of all of which are incorporated herein by reference.

TECHNICAL FIELD

This application relates to an apparatus and method of establishing an authentic and secure relationship between two messaging systems to exchange data. More specifically this application describes an apparatus and method of establishing an authentic relationship between a wireless handheld device ("mobile device") and a message center or host system using password-based authentication methods. The apparatus and method described herein is applicable to land-line environments as well as wireless environments.

BACKGROUND

There are several strong password-based encryption mechanisms currently known in the computer industry. Some of these implementations include Encrypted Key Exchange (EKE), Password Derived Moduli (PDM), and Simple Password-authenticated Exponential Key Exchange (SPEKE). These mechanisms are limited in their implementations and have not addressed the need of mobile devices. Additionally these mechanisms do not address the need of implementing perfect forward secrecy, such that if a security breach does take place all previous messages exchanged remain secure. A protocol provides perfect forward secrecy if past session keys are not compromised even if the long-term keys are compromised. (See, e.g., Menezes et al., Handbook of Applied Cryptography, 1996, p. 496). Perfect forward secrecy, also known as break-backward protection, means that all previous securely exchanged messages should remain secure despite anything that happens in the future.

DETAILED DESCRIPTION

Figure 1:
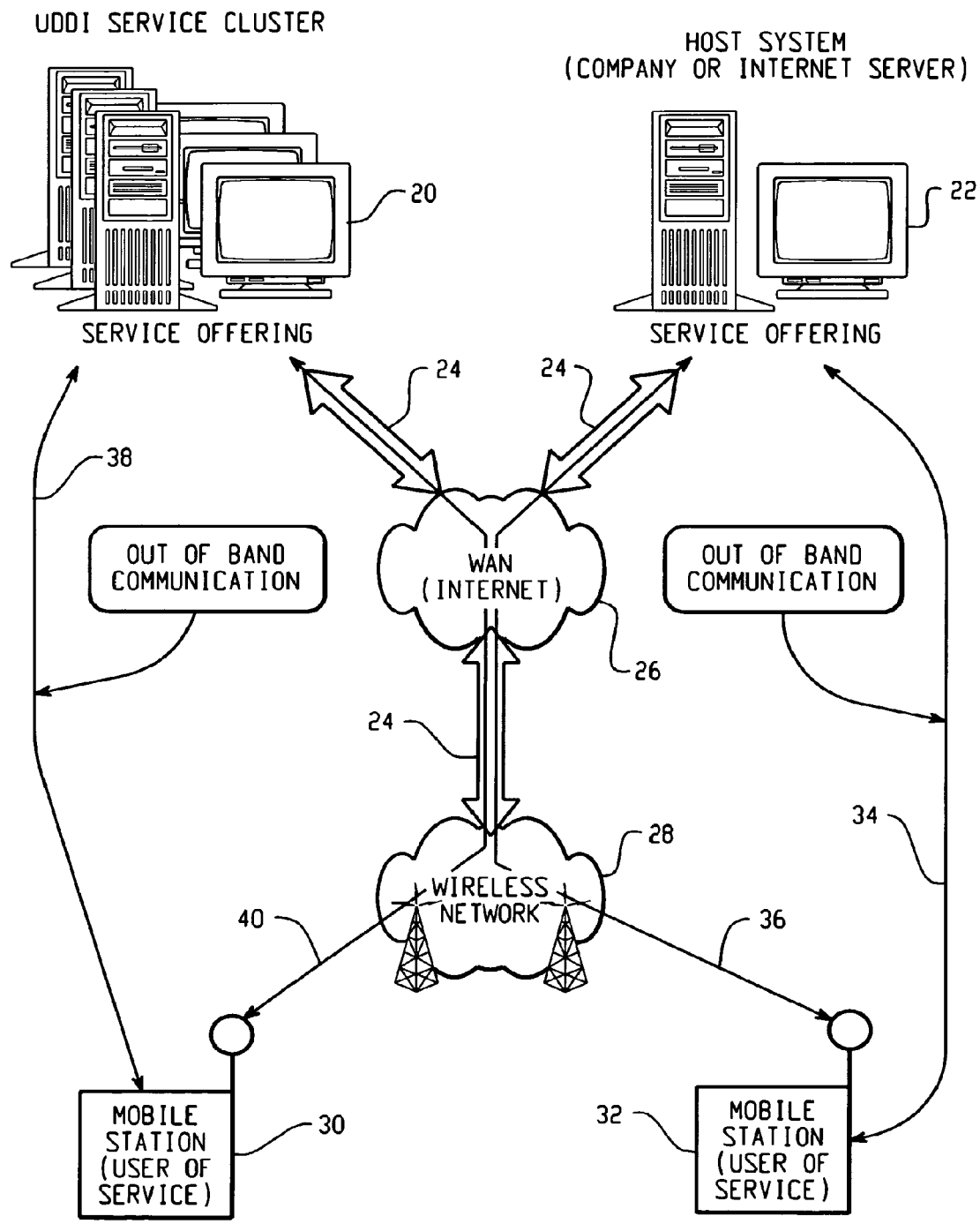
FIG. 1 shows a block diagram of a first exemplary communication system, between a fixed and a wireless system.

Referring to FIG. 1, there is shown a block diagram of a first exemplary communication system, between a fixed and a wireless system. This overview diagram shows a network environment where the invention is used. The diagram shows an exemplary embodiment of the invention and focuses on a network topology that includes a mobile device that is wireless. In this Figure there are systems offering services 20 and 22, and systems using the services 30 and 32. Between the service offering (also referred to herein as a service provider) and the service user are one or more networks and one or more connections to enable the flow of data between the two systems.

Turning now to FIG. 1 the service offering 20 or 22 can be many possible computers offering services to users. For one skilled in the art some well known service providers could be computers on the Internet within an Internet Service Provider (ISP) or Application Service Provider (ASP) office. The service offering 20 and 22 can also be one or more computers running within a private or public company, like a bank, stock broker, insurance broker or some other service-oriented company. The service offering 20 or 22 may also be run as part of a cluster of computers operating world-wide, making up a Universal Description, Discovery and Integration Cluster (UDDI cluster). The common element in all these service offerings 20 and 22 is that these service offerings 20 and 22 need to establish a secure data channel with a user. In the case of UDDI the secure relationship might be needed to exchange private service listings, or even to allow UDDI to proxy a service offering.

The mobile devices and the service hosts may be addressed in a variety of different ways. In some embodiments, they may be addressed with IP (internet protocol) addresses. In other embodiments, the host system may be addressed by an e-mail address. In yet another embodiment, the destination address may be an e-mail address of a user of the mobile device within the host system.

One skilled in the art will appreciate that the user of the service 30 and 32 might be a mobile hyper-text transfer protocol (HTTP) browser, a mobile wireless application protocol (WAP) browser, a proprietary transmission control protocol/internet protocol (TCP/IP) based application or some proprietary corporate solution. In this field there are new methods being developed quickly, including for example the new Java 2 Micro Edition (J2ME) solution for small wireless mobile devices, like cell phones and personal digital assistants (PDAs). For devices that use J2ME the option of attaching and downloading software through a service offering is becoming commonplace. Similarly the service offering 20 and 22 can be based on an HTTP web server solution, a Java Enterprise solution, a wireless markup language (WML) based service offering or some proprietary service solution created for a specific purpose.

It will be appreciated that mobile systems and host systems referred to herein can each comprise one or more respective memories (e.g., containing processing instructions) and one or more respective processing units, such as those conventionally known, e.g., general purpose processing units and/or special purpose processing units such as application specific integrated circuits (ASICs) and field programmable gate arrays (FPGAs), wherein the processing units can be configured (e.g., programmed with suitable software and/or firmware instructions, and/or produced with specialized hardware circuits) to carry out the approaches described herein. Each of such systems can also include any suitable interface(s), such as those conventionally known, which can operate in conjunction with a respective processing unit(s) to facilitate communication with other systems.

The end-points in the communication path are coupled through one or more data networks that allow the exchange of data, voice, video, music, photographs or any other digital media that can be exchanged through a data communications channel. The two main networks included in this illustration are a Wide Area Network (WAN) 26, the most common one being the Internet, and a wireless network 28. The wireless network 28 could be a GSM/GPRS network, a CDMA/1XRTT network, a CDMA2000 network, a 3$^{rd}$ Generation network like EDGE or UMTS or many other public wireless networks soon to be available. In an exemplary system these networks are coupled using links 24 like ISDN, T1, Ethernet (land-line and 802.11), Frame Relay, ATM, ADSL or some other high speed Internet connection to the host service 22. As greater amounts of data are being exchanged it is clear that security needs to be improved and made more foolproof to hackers and eavesdroppers. The invention works with these existing data communication paths to provide advanced password-based authentication. This level of security provides greater confidence that the recipient of any communicated data is exactly the entity you expect. One embodiment for a data communication path 36 is illustrated between a Host System service offering 22 and a user of the service on a mobile device 32. Another embodiment for a data communication path 40 is illustrated between a UDDI service offering 20 and a user of the service on a mobile device 30.

In one embodiment the host system service offering 22 has an out-of-band communication 34 (i.e., a communication over any suitable secure channel) with a user of a mobile device 32. The out-of-band communication path 34 is used for exchanging a shared secret, avoiding the insecure path that is to be made secure. Since the UDDI service cloud provides some level of security, a UDDI service cloud might be used to locate the service and receive the out-of-band shared secret with the final destination service. The following are a few examples of out-of-band communication paths 34 and 38:

(a) The mobile device user 30 or 32 and an operator at the host system 20 or 22, establish a phone call with each other to exchange the shared secret. The secret is then entered into each system and used in the process of creating an encryption key.

(b) The mobile device user 30 or 32 connects to a secure web site 20 or 22, either wirelessly or over a wired network and requests a key. The key is received and manually entered into the mobile device 30 or 32. The host system 20 or 22 could receive the key automatically from the web server, or it could also be manually entered. In some embodiments, a record is automatically generated after a shared secret was requested.

(c) The user of the mobile device 30 or 32 makes the request for the service and the shared secret is e-mailed by the host system 20 or 22 to their corporate mailbox that is known to be in a secure area. The user retrieves the shared secret from their electronic mailbox and manually enters it into the mobile device 30 or 32.

(d) The user of the mobile device 30 or 32 makes the request for the service and an operator at the service 20 or 22 generates a shared secret and it is given to a specified person who is known to be trusted and secure. This person could be a secretary or administrator of a given group; ideally it is someone that can confirm the identity of the user making the request. This trusted person then gives the shared secret to the final user of the mobile device 30 or 32 and it is manually entered into the mobile device 30 or 32.

This short list shows that there are many ways to authentically give a shared secret to a mobile device 30 or 32 user. The common property of these exemplary out-of-band communications 34 and 38 is that some level of authentication is built in or assumed in the choice made. This authenticated communication path is different than the non-authenticated data communication path.

Once the shared secret is exchanged the next step in creating a secure communication path 36 and 40 can take place. One of the better-known methods for creating a secure and authenticated link is using a strong password-based encryption method like SPEKE. SPEKE is a cryptographic method for knowledge-based authentication that leverages and protects easy-to-remember passwords—i.e. shared secrets. SPEKE is the simplest of the known strong password methods. It is a password-authenticated Diffie-Hellman exchange, where the password forms the base or "generator" of the exchange. (In standard Diffie-Hellman, the base is usually a fixed public number.) Once the communication path through the WAN 26 and wireless network 28 has made secure, the re-key sequence can be initiated. The re-key sequence allows for the generation of a new set of keys after a predetermined number of weeks or months. During this re-key sequence the advanced use of long-term encryption keys allows for the implementation of perfect forward secrecy. Once the authentication secret (shared secret) is used to create a secure path, it can be reused to create new keys at later dates. By using this invention the re-keying operation does not compromise previous keys and all previous conversations remain secret into the future.

Figure 2:
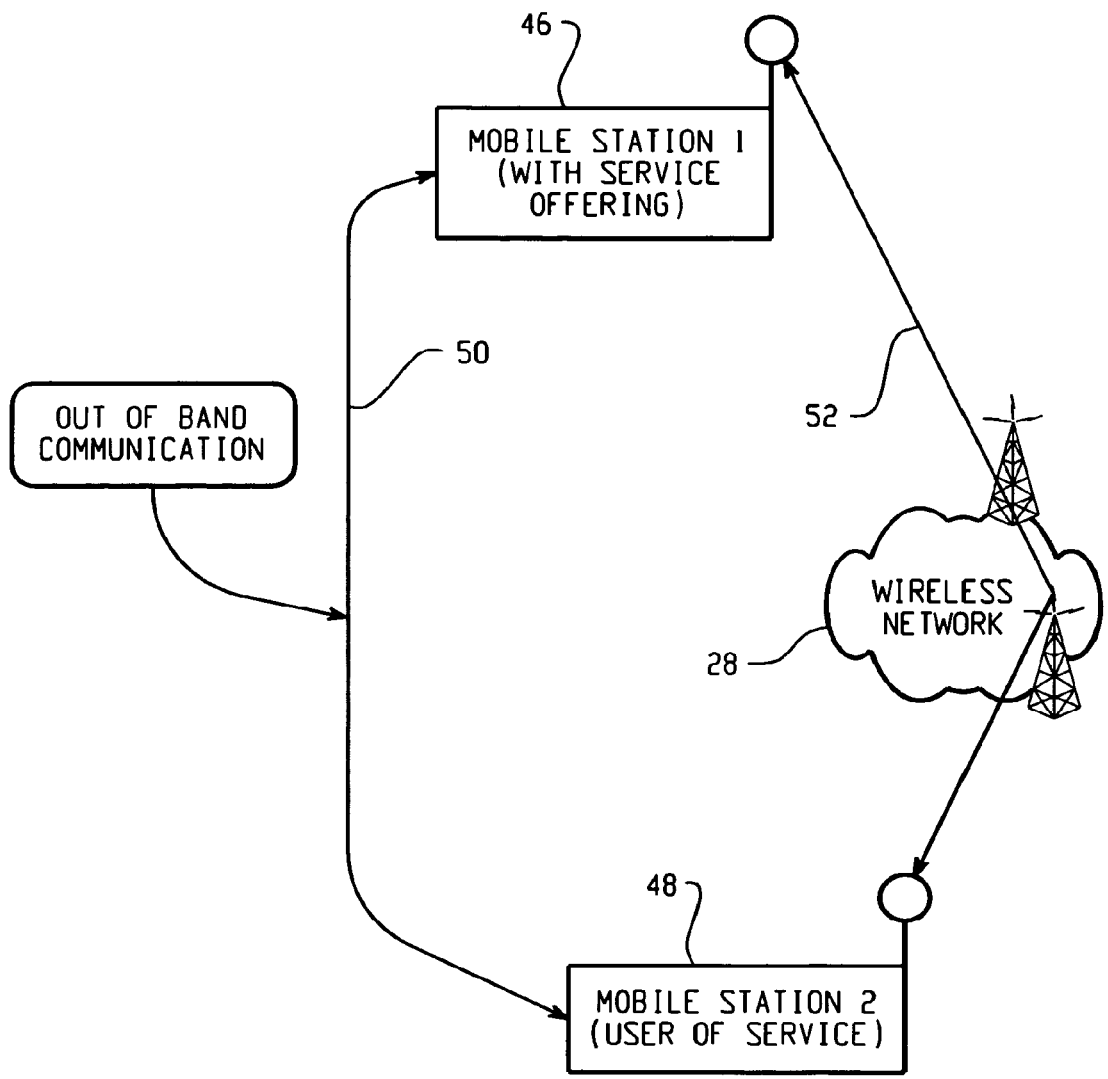
FIG. 2 shows a block diagram of a second exemplary communication system, between two wireless systems.

Turning to FIG. 2 there is shown a block diagram of an exemplary communication system, between two wireless systems, according to an embodiment of the present invention. In this embodiment, a secure path can be created between two mobile devices. In this embodiment mobile device 46 and mobile device 48 exchange a secret and are able to establish a common key using that shared secret. The out-of-band conversation 50 could take place via a phone call between the two parties, or a face-to-face meeting, or using one of the other methods already outlined or any other suitable method. Once the secret is shared, it can be manually typed into the mobile devices 46 and 48, and one station can initiate the exchange of messages to create a common master security key. This type of embodiment might be commonly used for private point-to-point e-mail conversations. It could also be used for point-to-point secure instant messaging data exchanges. In advanced usage mobile device 46, who is providing the service, might be running a web server on the mobile device 46 and offering some form of secure service offering that is also mobile.

Figure 3:
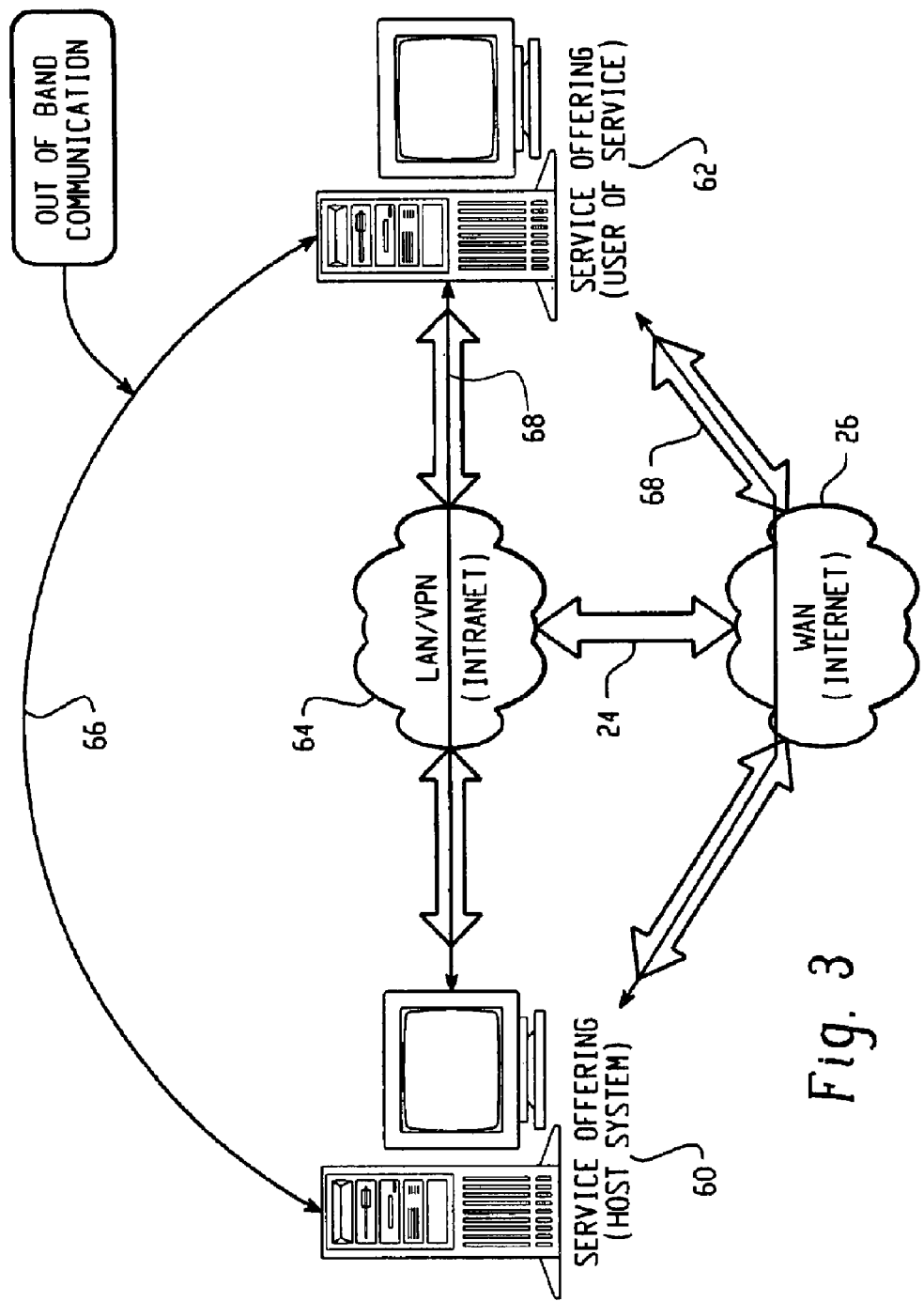
FIG. 3 shows a block diagram of a third exemplary communication system, between two fixed systems.

Turning to FIG. 3 there is shown a block diagram of an exemplary communication system, between two fixed systems, according to an embodiment of the present invention. In this embodiment the communication takes place between two Host Systems 60 and 62. In this illustration the service offering 60 and the service consumer 62 have an out-of-band conversation 66 and exchange a secret key. As described already this out-of-band communication could be a phone call, a communication via a browser with a secure SSL connection to generate and retrieve the key, or some other suitable communication such as provided earlier. Once the secret is exchanged an encryption key can be generated using strong password-based key generation methods like SPEKE. The communication path to exchange the key in this illustration could be over a WAN network like the Internet 26, or through an internal Intranet 64, or other suitable communication path such as or similar to an 802.11 or Bluetooth link. In these latter examples the service consumer 62 might be running a laptop or palmtop and already have a limited access to the Intranet, but greater security is required. It is well known in the art that 802.11b lacks the robust security requirements requested by most large computer departments inside companies. This embodiment illustrates that the invention can be used to provide the option of perfect forward secrecy when using a password-based authentication mechanism. Once suitable messages are exchanged to create the master key, the data communication path 68 can be used to exchange all forms of data secretly with high security.

Figure 4:
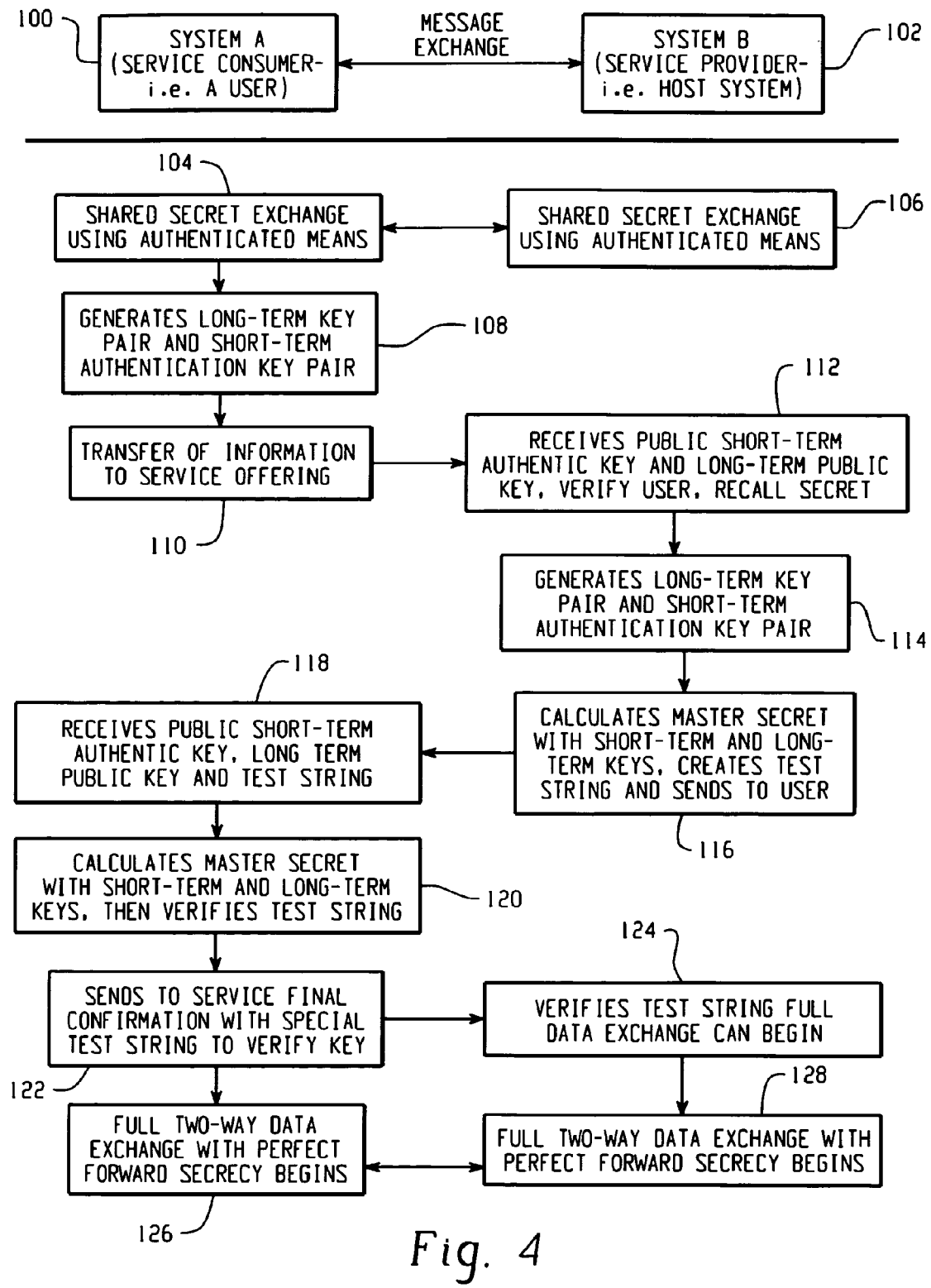
FIG. 4 shows a message exchange diagram of an exemplary set of data exchanges for implementing the communication system of FIG. 1 where a user is the initiator of the data exchange.

Turning to FIG. 4 there is shown a message exchange diagram showing an exemplary set of data exchanges for generating and verifying a master key, where the user is the initiator of the data exchange. This illustration shows exemplary steps and message exchanges between a service consumer 100 (user) and a service provider 102. In this illustration one end of the connection is considered a service consumer or user 100, and has been given the label system A. The other end of the connection is considered the service provider (also referred to as a service offering) or host system 102, and has been given the label system B. In this example the user 100 initiates the exchange of data to create a secure connection. Between System A and System B is a message exchange over one or more data communication networks such as illustrated in FIG. 1. Similarly as shown in FIGS. 1, 2 and 3, the user could be a mobile device 30, 32 or 48, or a Host System 62. Likewise the service provider could be a mobile device 46 or a Host System 20, 22 or 60.

As shown at step 104, the user 100 contacts a known service provider 102 through one of the methods already described for out-of-band communication or through another suitable method to exchange a shared secret. This service provider 102 wants to facilitate this exchange and issues a secret password or simple, easy to remember password strings (step 106). Through this mechanism a shared secret is generated and exchanged between the two parties. The user 100 receives and saves the secret to assist in encryption key generation. Alternatively, the service provider 102 can receive a secret password (shared secret) from the user 100. In either case, the service provider saves the shared secret in relation to this user.

After exchange of the shared secret, the user 100 then initiates (in this example) steps of generating key pairs (step 108) and transferring key information to the service provider (step 110). In particular, the user 100 generates a long-term encryption key pair at step 108, i.e., the public and private parts of an encryption key. A short-term authentication key pair is also generated at step 108 by the user 100. This short-term key pair is referred to as an authentication key pair in this example because it is generated using the shared secret as discussed further below.

Once the user's short-term and long-term key pairs are generated, the public keys thereof are transmitted at step 110 to the service provider 102 to further generate the final master key (also referred to as a master secret). This transfer can take place over an insecure link, as only the host system 102 that issued the shared secret can understand and use the short-term authentication key to generate the master key. Once the user's public keys are received by the service provider (step 112), the user is verified, and the shared secret for that user is recalled 112. Once the user is verified and the shared secret for the user is recalled, the service provider 102 proceeds to generate its own short-term authentication key pair using the shared secret (step 114). The service provider 102 also generates its own long-term encryption key pair (step 114). Using the public keys generated by the user 100 and using the shared secret, the service provider 102 generates a master encryption key (or master secret) as shown at step 116. The shared secret provides the authentication necessary to trust the information exchanged. The service provider's short-term public authentication key, the service provider's long-term public encryption key, and a key confirmation value that has been calculated by the service provider using the newly generated master encryption key, and some known string, are sent to the user (step 116).

The user receives the information (step 118) sent from the service provider 102 including the service provider's short-term and long-term public keys and generates the user's own master key (step 120). With this master key the user verifies the key confirmation value (step 120). In this example, the key confirmation value could be the hash of the master key and the name of the service or some other known string, agreed upon by the user and the service provider. If the key confirmation value does not verify, the master key created by the user 100 is not trusted, and it is assumed that someone is trying to compromise the connection. If the master encryption key generated by the user 100 seems valid the user then sends a final key confirmation value back to the service provider (step 122). The service provider receives the message, verifies the final key confirmation value and marks the user as ready to go (step 124). This allows full data exchange to take place from the service provider's point of view (step 128). On the user side, once the verification message is sent there would be a slight pause in transmission but then full data exchange can begin (step 126).

Transmissions may comprise e-mail messages, HTTP (hypertext transfer protocol)-based traffic, such as XML (extensible markup language), WML (wireless markup language), etc., or other types of traffic.

In some embodiments, the host system is capable of sending a data payload in a message sent to the mobile device before the final confirmation value is sent to it from the mobile device. The payload in this message may be a service book entry that defines the host service at the host system. In some embodiments the service book entry may be a UDDI service entry that defines attributes of a host service at the host system being accessed.

It will be appreciated that the long-term encryption key pair generated by a first party (e.g., a user) as described herein is an example of, more generally, a first key pair, wherein the public key portion and the private key portion thereof can be referred to as a first public key and a first private key. Similarly, the short-term authentication key pair (also referred to as a short-term encryption key pair) generated by the first party (e.g., the user) as described herein is an example of, more generally, a second key pair, wherein the public key portion and the private key portion thereof can be referred to as a second public key and a second private key. Also, the long-term encryption key pair generated by a second party (e.g., a service provider) as described herein is an example of, more generally, a third key pair, wherein the public key portion and the private key portion thereof can be referred to as a third public key and a third private key. Similarly, the short-term authentication (or encryption) key pair generated by the second party (e.g., the service provider) as described herein is an example of, more generally, a fourth key pair, wherein the public key portion and the private key portion thereof can be referred to as a fourth public key and a fourth private key. The first party that generates the first and second key pairs could be a user, such as described in the example above, or a service provider, such as described in the example below.

Figure 5:
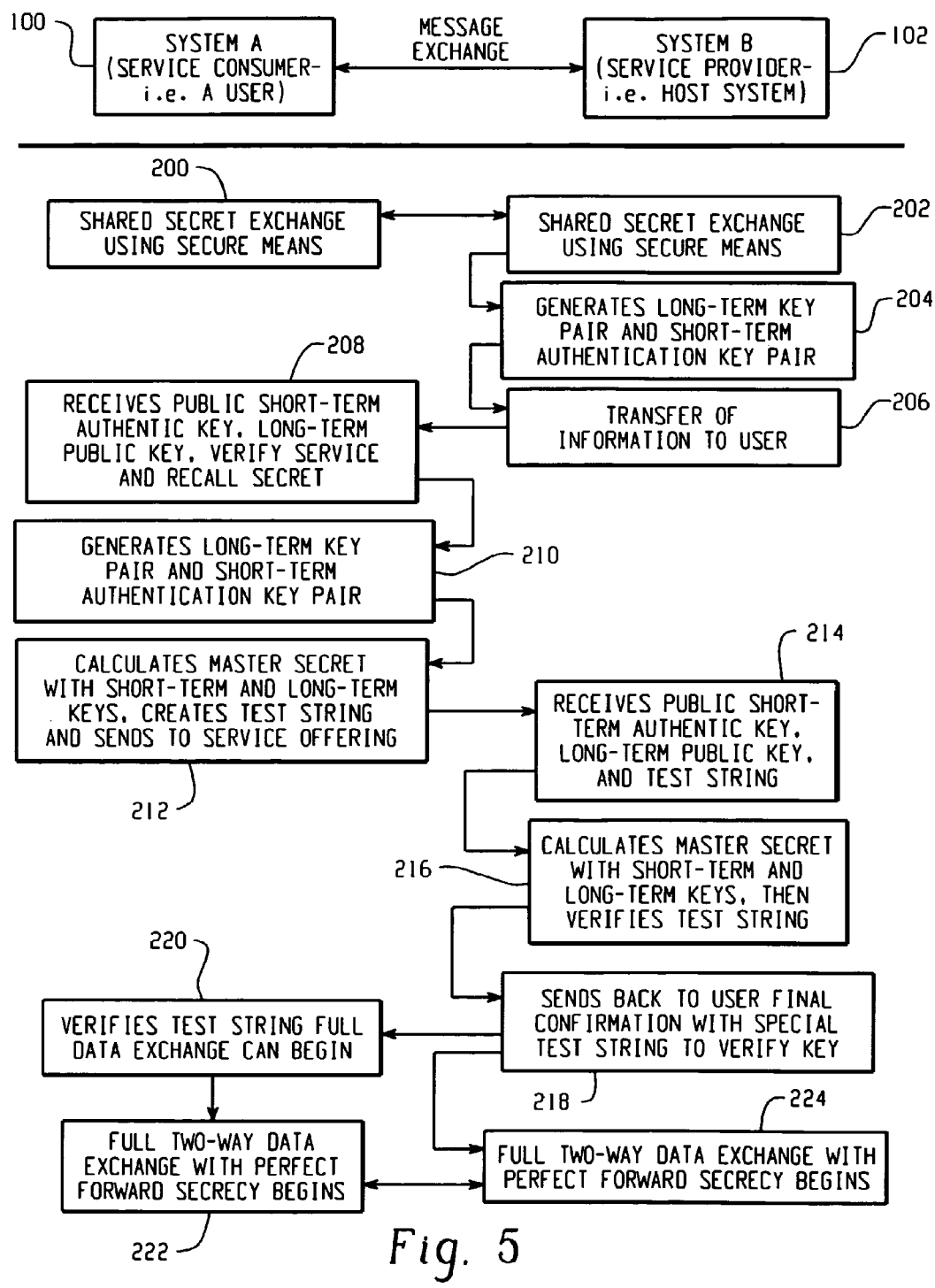
FIG. 5 shows a message exchange diagram of an exemplary set of data exchanges for implementing the communication system of FIG. 1 where a service provider is the initiator of the data exchange.

Turning to FIG. 5 there is shown a message exchange diagram showing an exemplary set of data exchanges for generating and verifying a master key, where the service provider is the initiator of the data exchange. The steps within FIG. 5 substantially correspond to the steps within FIG. 4, except the service provider takes the first step. This example highlights that either the user or the service provider can be the initiator of the data exchange. In this illustration one end of the connection is considered the user 100, and is labeled system A—service consumer. The other end of the connection is considered the service 102, and is labeled system B—Service Provider. Between System A 100 and System B 102 is a message exchange over one or more data communication networks 26, 28 and 64 such as illustrated in FIGS. 1, 2 and 3. Similarly as shown in FIGS. 1, 2 and 3, the user could be a mobile device 30, 32 or 48, or a Host System 20, 22, 46 or 60.

As shown at steps 200/202, the service provider 102 contacts the user 100 (in this example) to exchange a shared secret. Alternatively, the user could initiate this communication. It is contemplated that an administrator within a host company 102 might contact the user 100 and inform the user that the user has to perform some action with the shared secret being provided. Using any suitable method selected from the extensive list of out-of-band communications already provided, or some other suitable method, the shared secret is generated and exchanged (steps 200 and 202). The User component receives and saves the shared secret to assist in encryption key generation. Alternatively, the service provider 102 can receive a secret password (shared secret) from the user 100. In either case, the service provider saves the shared secret in relation to this user.

After exchange of the shared secret, the service provider 102 can initiate (in this example) steps of generating key pairs (step 204) and transferring key information to the user 100 (step 206). In particular, the service provider 102 generates a short-term authentication key pair and a long-term encryption key pair (step 204). This corresponds to step 108 in FIG. 4.

Once the service provider's short-term and long-term key pairs are generated, the public keys thereof are transmitted to the user (step 206) to further generate the final master key (also referred to as a master secret). This transfer can take place over an insecure link as only the owner of the shared secret would be able to understand and use the short-term authentication key to generate the master key. The service provider's public keys are received by the user, and it checks memory to verify the service creation is expected and that it has a shared secret saved in memory (step 208). The user recalls the shared secret for that service provider 102 and generates a short-term authentication key pair using the shared secret (step 210). The user also generates a long-term encryption key pair (step 210). Using the public keys generated and sent by the service provider 102 and using the shared secret, the user 100 generates a master encryption key (or master secret) as shown at step 212. After generating the master key the user 100 also generates a key confirmation value by combining a known string (i.e., known to itself and the service offering) with the master key (step 212). The user's short-term public authentication key the long-term public encryption key, and the key confirmation value are sent to the service provider (step 212).

The service provider receives the user's public keys and key confirmation value and verifies the sender of the information (step 214), and also recalls the shared secret for this user. With the received public key values of the user, the service provider recalls its own saved private key values for this user (step 214). Using the received public keys of the user and the service provider's saved private keys, the service provider can now generate a master key (step 216). After generating the master key, the service provider 102 verifies the key confirmation value by calculating its own key confirmation value, using the known string and the newly created master key, and comparing it against the received key confirmation value (step 216). If the key confirmation value does not verify, the created master key is not trusted, and it is assumed that someone is trying to compromise the connection. If the key confirmation value does verify, the master encryption key is considered valid and the service provider 102 sends a final key confirmation value back to the user (step 218). The user receives the message (step 220), verifies the final key confirmation value, and marks the service provider as ready to go (step 220). This allows full data exchange to take place from the user's point of view (step 222). On the service offering side, once the verification message is sent there would be a pause in transmission, but then full data exchange can begin (step 224). In most cases it will be the user that initiates the first data exchange; so having the confirmation sent to the user does have some advantages.

Transmissions may comprise e-mail messages, HTTP (hypertext transfer protocol)-based traffic, such as XML (extensible markup language), WML (wireless markup language), etc., or other types of traffic.

Figure 6:
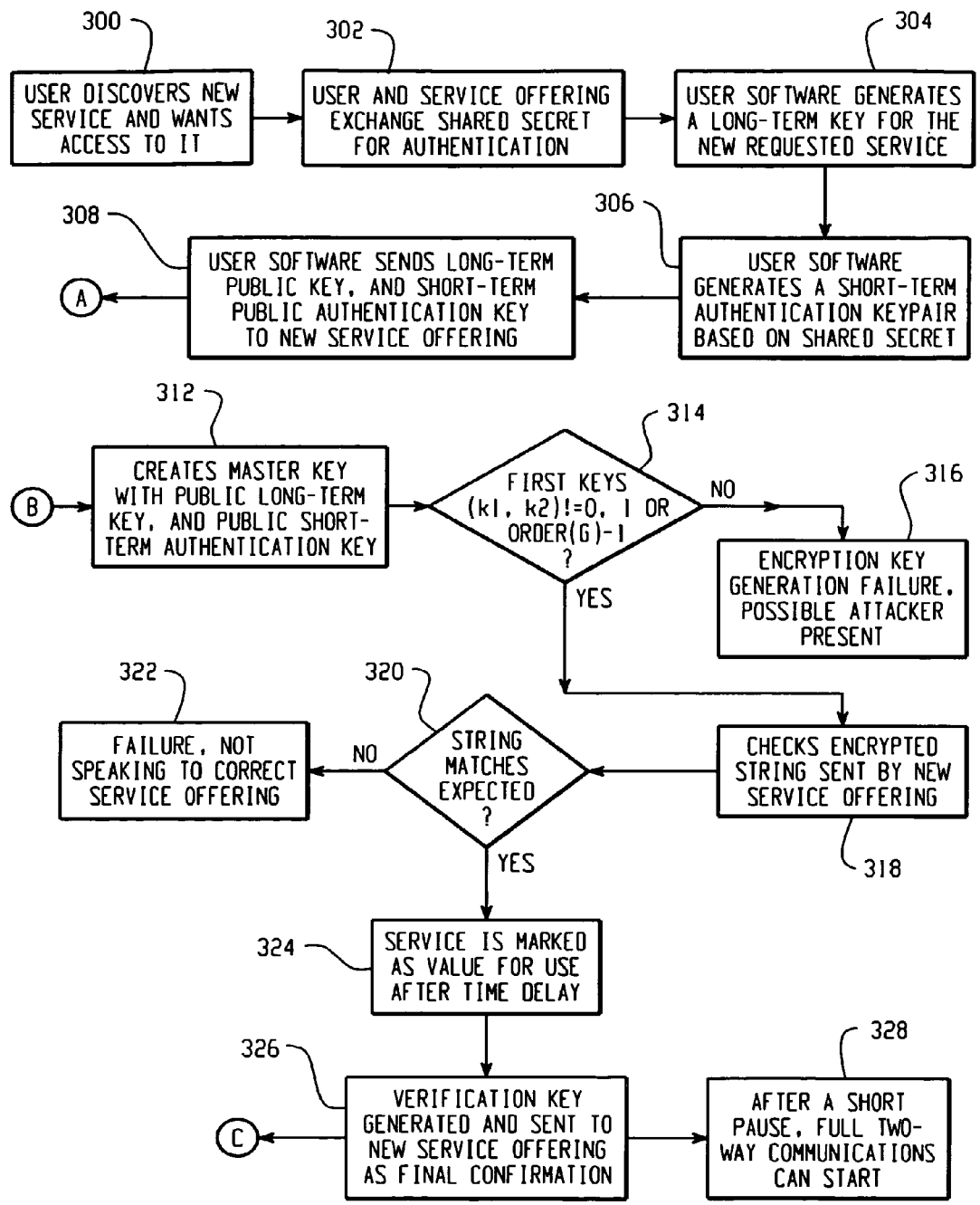
FIG. 6 shows a data flow diagram of the steps within the user software for carrying out the steps in FIG. 4 where the user is the initiator of the key exchange.

FIG. 6 is a data flow diagram of exemplary steps carried out by the user (e.g., within the user software) for carrying out the exemplary approach shown in FIG. 4, when the user is the initiator of the key exchange. The first step occurs when the user discovers a new service and wants to access it (step 300). This might occur via a UDDI-like service, through a corporate Intranet service, through browsing the world-wide web, through conversation with a friend or through a phone call. Once the service and user have connected, they exchange a shared secret 's' that only the two of them know (step 302). Exemplary methods for this exchange have been described in detail already. This shared secret 's' will be used later like a PIN (Personal Identification Number) to authenticate the user and the service to each other. When the user is ready to access the service, the user (e.g., in software) generates a long-term key pair for the requested service (step 304). This long-term key pair is one of the key values used during all for future re-keying operations. For all of the mathematical calculations in the remainder of this application, we assume that all parties involved in the transactions have agreed beforehand on a group G, of size order(G), and an element g of G such that q=order(g) is a large prime number. G and g may be publicly known, i.e., they do not need to be kept secret. Exemplary mathematical calculations to create key values are as follows (using a SPEKE method), and while the exemplary calculations shown below utilize a multiplicative group, it will be apparent that suitable calculations could be carried out using an additive group:

Pick A Lone-Term Key Pair (e.g., by User)
Pick Random a, $1<a<q-1$;
Calculate $A=g^a$;
If $A=1$, keep choosing different a's until $A<>1$.

The value 'A' is the user's long-term public key (or, more generally, first public key), and the value 'a' is the user's long-term private key (or, more generally, first private key).

The selected number 'a' is greater than 1 and less than the prime number q−1. Once the private key is selected (i.e. 'a') and the public key is generated (i.e. 'A'), the private key 'a' is stored securely, and the public key 'A' is eventually transmitted to the service provider.

A short-term authentication key pair is also generated by the user based on the shared secret 's' (step 306). Using a similar calculation following a SPEKE key generation method, exemplary mathematical calculations for this step are (using, e.g., the same assumptions for q and for 'a' (as now applied to x) as before):

Pick A Short-Term Authentication Key Pair (e.g., by User)
Pick Random x, $1<x<q-1$;
Calculate $X=s^x$;
If X=1 keep choosing new x's until X<>1.

The value 'X' is the user's short-term public key (or, more generally, second public key), and the value 'x' is the user's short-term private key (or, more generally, second private key). The value 's' is the shared secret.

The selection of 'x' is between 1 and the prime number q−1. The user software then sends the public key values 'A' and 'X' to the service offering (service provider) as shown at step 308. This step proceeds to (A) where the service offering receives the values and performs additional calculations, shown in FIG. 7. Once the service offering has completed those calculations, it returns a similar pair of its own public key values 'B' and 'Y' with a key confirmation value to the user for verification (step 312) as discussed further below in connection with FIG. 7. This is shown as input (B) in FIG. 6 coming from FIG. 7. At this point the user is able to use 'B' and 'Y' to create a master key using, e.g., advanced SPEKE calculations. By using both 'B' and 'Y' together to generate the master key, the encryption method allows for the implementation of perfect forward secrecy. This is seen more clearly in the re-key sequence shown later. An exemplary master key calculation is as follows:

Calculate Master Key (e.g., by User)
$k1=Y^x$;
$k2=B^a$;
check that k1, k2 !=0, 1, or order(G)−1;
k=hash (k1∥k2) where ∥ a concatenation function.

Here, 'x' is the user's short-term private authentication key (or, more generally, second private key), and 'Y' is the received short-term public authentication key of the service offering (or more generally, fourth public key). Also, 'a' is the user's long-term private encryption key (or, more generally, first private key), and 'B' is the received long-term public encryption key of the service offering (or, more generally, third public key).

The value 'k' represents the master key that can be used for encrypting data between the user and the service. The value 'k' is a combination of the intermediate keys 'k1' (based on the short-term authentication keys) and 'k2' (based on the long-term encryption keys). An important check can be made on the intermediate key values of k1 and k2 at step 314 to verify that these two values are not 0, 1 or order(G)−1; otherwise it could mean there is a security attack being attempted 314. This attack would result if the key were being forced into a small subset of total possible keys. If the attacker sends an X=0 or Y=0, the communicating parties could get a resulting key value of 0. This quick check will ensure that an attack is not being staged. If however the value of k1 or k2 does fall into one of these small subset groups, the negotiation for a key can be aborted 316.

If a subset attack is not detected, the master key 'k' can be used by the user to test the key confirmation value sent by the service offering (step 318). One method for generating a key confirmation value is to hash the key with a known string such as the bytes in the public key "A". An exemplary calculation to test key confirmation value would be:

Test Key Confirmation Value
"Received $h_A$"=$h_A$=hash (k∥bytes of public key"A") where "received $h_A$" came from the service offering, and 'k' is the local master key.

If the software's generated key confirmation value for 'A' does not match (step 320) the received key confirmation value, then it is incorrect (step 322). An incorrect key confirmation value could mean that a man-in-the-middle attack, or some other attack is being attempted. The operation will be aborted in this case (step 322). If the two confirmation values match, then it is assumed that a fully secure link has been established (step 324). The link is marked as valid and after a short delay will be used for communications (step 324). Using a newly generated verification key, the user sends this value back to the service (step 326). This follows back to FIG. 6 following label (C). After a few moments pause, i.e., to ensure the confirmation is received by the service offering, the user can being to exchange data (step 328).

Any suitable encryption and decryption methods can be used to encrypt and decrypt messages using the master key, such as symmetric-key encryption/decryption methods like the Advanced Encryption Standard (AES) (Federal Information Processing Standards Publication 197, Nov. 26, 2001, National Institute of Standards and Technology).

Figure 7:
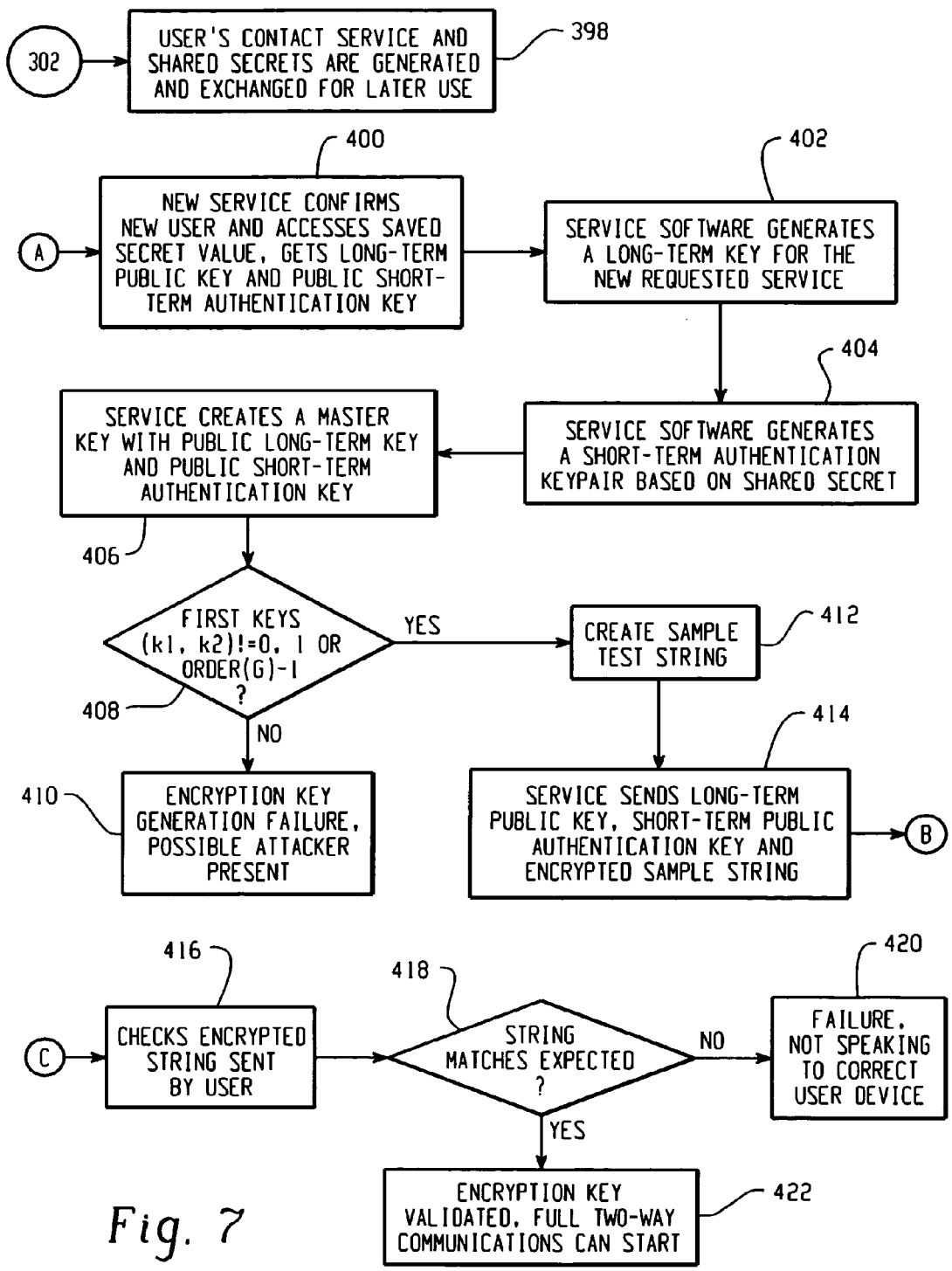
FIG. 7 shows a data flow diagram of the steps within the service software for carrying out the steps in FIG. 4 where the user is the initiator of the key exchange.

FIG. 7 is a data flow diagram of exemplary steps carried out by the service offering (e.g., within the service provider software) for carrying out the exemplary approach shown in FIG. 4 when the user is the initiator of the key exchange as shown in FIG. 4. The process starts when a user contacts a service provider 'out-of-band' to exchange a shared secret (step 398). This corresponds with step 302 in FIG. 6 on the user's device. This out-of-band exchange has been discussed several times and also provides a level of authentication that the user and service are who they say they are. Once this exchange is complete, the user is free at any point in time to contact the service to begin the process. Once the user does contact the host service, shown with message (A) arriving from the user's flow chart in FIG. 6, the new user is verified (step 400). Since a service provider might have tens or hundreds of users wanting to start using their service at any time, the service provider is passive until the user decides he wants to start the service. Even though a shared secret has been exchanged this may mean very little, and stale shared secrets might even be purged after some number of days if the user fails to connect over that time period. The arrival of the message allows the service provider to find the new user and verify that a shared secret exists (step 400). In the message is the user's public short-term authentication key, which is based on the shared secret (step 400). The message also contains the user's public long-term encryption key (step 400), which can be used in the implementation to create perfect forward secrecy when re-key operations take place, FIGS. 7 and 8.

The service offering generates a long-term encryption key pair for this user, in a manner similar to the long-term encryption key-pair created by the user (step 402). Exemplary mathematical calculations to create the service offering's long-term encryption key pair are as follows (e.g., using a SPEKE method):

Pick A Lone-Term Key Pair (e.g., by Service Provider)
Pick Random b, $1<b<q-1$;
Calculate $B=g^b$
If B=1, keep choosing different b's until B< >1.

The value 'B' is the service offering's (service provider's) long-term public key (or more generally, third public key), and the value 'b' is the service offering's long-term private key (or, more generally, third private key).

The selected number 'b' is greater than 1 and less than the prime number q−1. Once the private key 'b' is selected and the public key 'B' is generated, the private key 'b' is stored securely, and the public key 'B' is eventually transmitted back to the user so he can use it in his calculations.

The service offering also generates a short-term authentication key pair based on the shared secret (step 404). Using a similar calculation following a SPEKE key generation method, exemplary mathematics for this step are (using, e.g., the same assumptions for q and for x (as now applied to y) as before):

Pick A Short-Term Authentication Key Pair (e.g., by Service Provider)
Pick Random y, $1<y<q-1$;
Calculate $Y=s^y$;
If Y=1, keep choosing y's until Y< >1.

The value 'Y' is the service offering's (service provider's) public short-term authentication key (or, more generally, fourth public key), and the value 'y' is the service offering's private short-term authentication key (or, more generally, fourth private key).

The selection of 'y' is between 1 and the prime number q−1. The public key values 'B' and 'Y' will eventually be sent to the user to generate the user's own master key.

The service offering then uses the public keys 'A' and 'X' received from the user, and the private keys just calculated to generate a master key (step 406). By using both 'A' and 'X' together to generate the master key the encryption method provides perfect forward secrecy. To provide perfect forward secrecy the implementation also uses the private keys in the re-generation of subsequent keys during any re-key sequence. An exemplary master key calculation is as follows:

Calculate Master Key (e.g., by Service Provider)
$k1=X^y$;
$k2=A^b$;
check that k1, k2 !=0, 1, or order(G)−1;
k=hash (k1||k2).

Here, 'y' is the service offering's short-term private encryption key (or, more generally, fourth private key), and 'X' is the received short-term public encryption key of the user (or, more generally, second public key). Also, 'b' is the service offering's long-term private key (or, more generally, third private key), and 'A' is the received long-term public encryption key of the user (or, more generally, first public key).

The value 'k' represents the master key generated by the service offering, and it is the same as the master key generated by the user. This master key can be used for encrypting data between the service and the user. The value 'k' is a combination of the intermediate keys 'k1' (based on the short-term authentication keys) and 'k2' (based on the long-term encryption keys). An important check can be made on the intermediate key values of k1 and k2 at step 408 to verify that these two values are not 0, 1 or order(G)−1; otherwise it could mean there is a security attack being attempted. This attack would result if the key were being forced into a small subset of total possible keys. If the attacker sends an X=0 or Y=0 the communicating parties could get a resulting key value of 0. This quick check will ensure that an attack is not being staged. If however the value of k1 or k2 does fall into one of these small subset groups the negotiation for a key can be aborted (step 410).

If a subset attack is not detected, the master key 'k' can be used by the service offering to test the key confirmation value sent by the user (step 416). One method for generating a key confirmation value is to hash the key with a known string such as the bytes in the public key "B". An exemplary calculation to test the string (key confirmation value) would be:

Test Key Confirmation Value
$h_B$=hash (k||bytes of public key "B").

The service offering would then transmit the test string to the user so that the user can verify that the master key generated by the user matches the master key created by the service offering. The service offering then sends the long-term public encryption key 'B', the short-term public authentication key 'Y' (or, fourth public key) and the verification string $h_B$ to the user (step 414).

Once the user has generated its own master key 'k' it sends back a final key confirmation value to ensure the service offering knows that everything has worked correctly (C). This final step (C) is shown in FIG. 7 as an input to the service offering at step 416. If the final key confirmation value was calculated based upon 'A' and sent to the service offering (step 416), then this is what the test looks for (step 418). If the final key confirmation value does not match the expected value the operation is aborted (step 420). If the key confirmation value is matched then it is assumed that a full two-way encrypted and secure data communication path exists (step 422).

The Re-Key Data Flow Sequence

Figure 8:
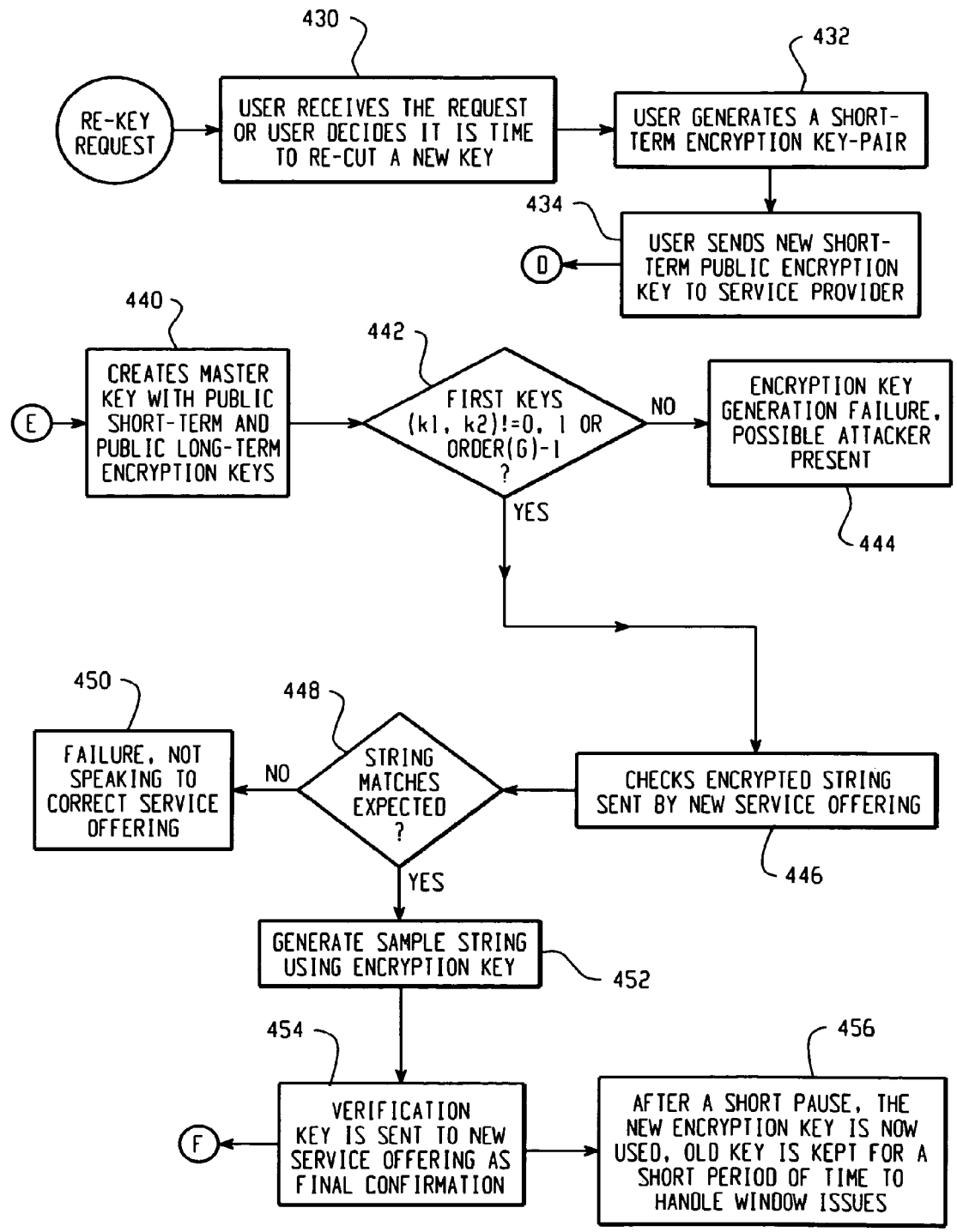
FIG. 8 shows a data flow diagram of the steps within the service user for a re-key sequence when regenerating another key in the environment illustrated in FIGS. 1, 2 and 3.

FIG. 8 is a data flow diagram showing exemplary steps within the user (e.g., within software) for a re-key sequence when regenerating another key in the environment illustrated in FIGS. 1, 2 and 3. This procedure illustrates the utility of using the long-term encryption key to enable the implementation of perfect forward secrecy. The process starts when either the user or the service offering decide a new key is required. For this example we will assume the host (service provider) is running an encryption key expiry timer. However, there are many other ways the encryption key might be re-generated. The user might decide that it is time for a new key, the user or service might have fears that someone has been trying to attack and determine the current key value. Whatever the case, a new key is desired, and a unique method, not based on the original shared secret, can be used to generate the new key.

As shown in the example of FIG. 8 a re-key request is received by the user, or the user decides to cut a new key (step 430). Of course, step 430 could be executed by the service provider instead of the user. The user software generates a new short-term encryption key (step 432). An exemplary mathematical calculation is based on SPEKE and uses the same sequence as shown before:

Pick A New Short-Term Encryption Key Pair (e.g., by User)
Pick Random x, $1<x\leq q-1$;
Calculate $X=g^x$;
If X=1, keep choosing x's until X< >1.

Here, 'x' is a "new" value generated for the user's short-term private encryption key. The value 'x' can be referred to either as an "encryption" key or as an "authentication" key (as was done previously) because the value 'x' contributes to both aspects. The selection of 'x' must be between 1 and the prime number q−1. The user software then sends the newly generated public key value 'X' to the service provider (step 434). This step proceeds to (D) where the service provider receives the value and performs additional calculations. Step (D) is taken into FIG. 9 as input on the service provider side of the connection.

Once the service provider has completed those calculations with (D) shown in FIG. 9, it returns a similar new public encryption key 'Y' (discussed further below) with a key confirmation value for verification by the user (E). This is shown as input (E) in FIG. 8. At this point the user is able to use the service provider's new 'Y' key with the service provider's older long-term public 'B' key to create a master key following advanced SPEKE calculations, for example. By using both the existing 'B' and the new 'Y' together to generate the key, the encryption method can provide implementation of perfect forward secrecy. Perfect forward secrecy can be achieved because neither the existing 'B' nor the new 'Y' are based on the original shared secret, and the existing 'B' is combined with the new 'Y' to create a new key not directly based on the previous key. Additionally, the existing 'B' key carries some of the authentication generated with the original shared secret. Only an authenticated service provider, that originally possessed the shared secret, would have been able to have the private key 'b' saved to disk. This is seen more clearly in the exemplary re-key mathematical calculation to create a new master key 'k':

Calculate Master Key (e.g., by User)
$k1=Y^x$;
$k2=B^a$;
check that k1, k2 !=0, 1, or order(G)−1;
k=hash (k1∥k2).

Here, 'x' is the user's new short-term private encryption key, and 'Y' is the new received short-term public encryption key generated by the service provider. The value 'a' is the user's existing long-term private encryption key, and 'B' is the service provider's existing long-term public encryption key.

The value 'k' represents the new master key that can be used for encrypting data between the user and the service provider. The value 'k' is a combination of the intermediate keys 'k1' (based on the short-term encryption key) and 'k2' (based on the long-term encryption keys). An important check can be made on the intermediate key values of k1 and k2 (step 442) to verify that these two values are not 0, 1 or order(G)−1; otherwise or it could mean there is a security attack being attempted (step 442). If however the value of k1 or k2 does fall into one of these small subset groups the negotiation for a key can be aborted (step 444).

If a subset attack is not detected, the new master key 'k' can be used to test the key confirmation value sent by the service offering (service provider) as shown at step 446. One method for generating a key confirmation value is to hash the key with a known string like the bytes of the public key of "A". The approach for calculating a key confirmation value can be the same as previously described. If the calculated key confirmation value does not match what was received (step 448), the key is assumed to be in error (step 450). An incorrect key confirmation value would mean that a man-in-the-middle attack, or some other attack is being attempted. Otherwise the user generates a final key confirmation value using the master key 'k' (step 452). The final key confirmation value is sent to the service provider (step 454) as a final confirmation; as shown at point (F) in FIG. 8. Then after a short pause the new encryption key is used within the user software (step 456). During a short period of time there is also a window where messages that were previously transmitted could arrive in. During this period of several minutes the old key is kept and tried if decryption errors occur (step 456).

Figure 9:
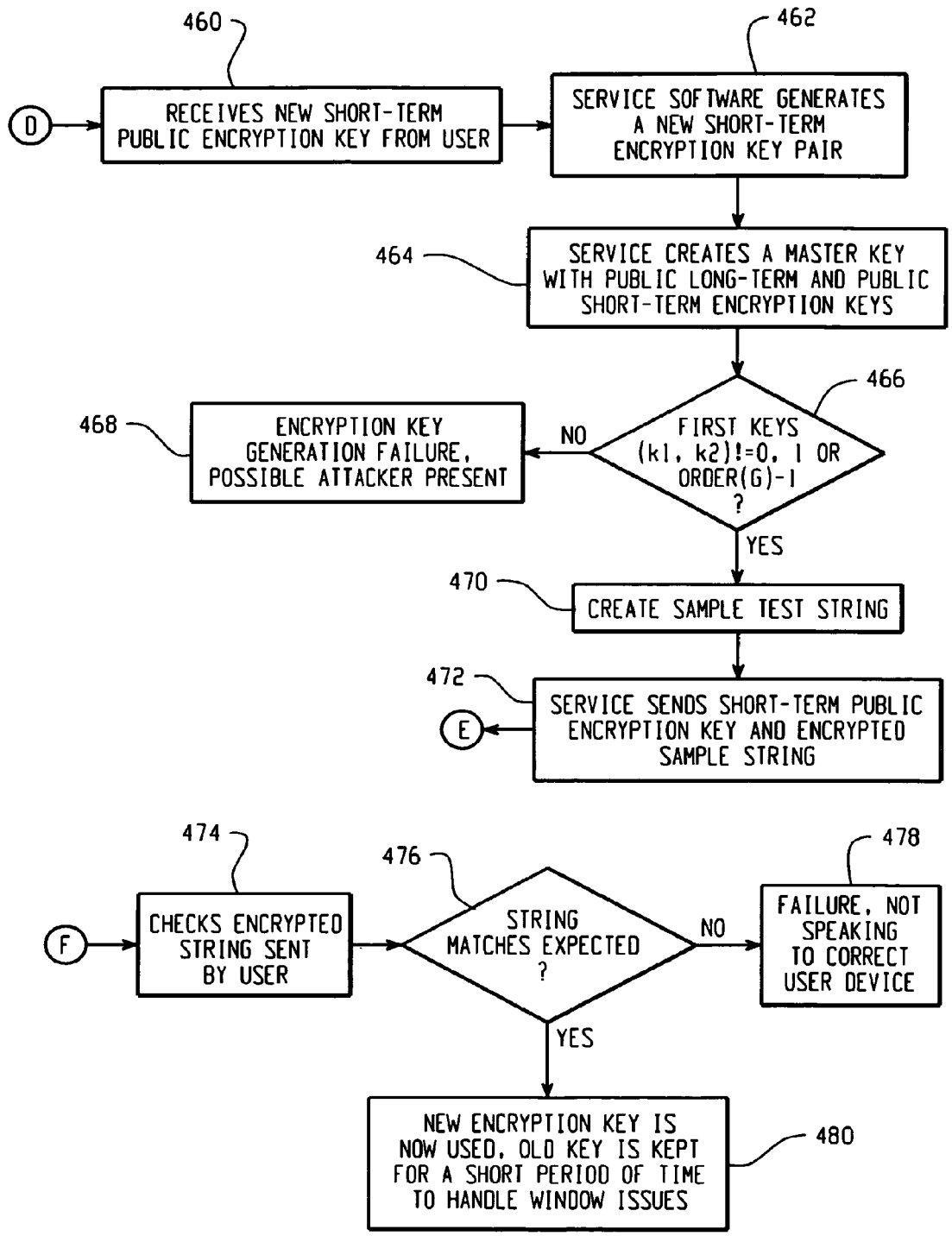
FIG. 9 shows a data flow diagram of the steps needed within the service provider for a re-key sequence when regenerating another key in the environment illustrated in FIGS. 1, 2 and 3.

Turning now to FIG. 9 this represents a data flow diagram of exemplary steps within the service provider for a re-key sequence when regenerating another key in the environment illustrated in FIGS. 1, 2 and 3. This procedure shows the utility of using the long-term encryption key for implementing perfect forward secrecy. In this embodiment we have assumed the user has started the process and has already created a new short-term encryption (or authentication) key pair as shown in FIG. 8. The arrival of the short-term public encryption key 'X' is shown as input (D). The public key is received and the user's configuration information is recalled and checked (step 460). The service offering then generates a new short-term encryption key pair for use over the next segment of time (step 462). Exemplary mathematics to create a new short-term encryption key is similar to what has been shown before, except the shared secret 's' is not used.

Pick A New Short-Term Encryption Key Pair (e.g., by Service Provider)
Pick Random y, 1<y<q−1;
Calculate $Y=g^y$;
If Y=1, keep choosing random y's until Y<>1.

The selection of 'y' is between 1 and the prime number q−1. The value 'Y' will eventually be sent to the user to generate a master key (step 472).

After picking a new short-term encryption key pair, a master key is generated by the service provider using the value 'X' that was just received from the user and the newly generated value 'y'. By using both 'A' and 'X' together to generate the key, the encryption method provides for perfect forward secrecy. An exemplary master key calculation is as follows:

Calculate Master Key (e.g., by Service Provider)
$k1=X^y$;
$k2=A^b$;
check that k1, k2 !=0, 1, or order(G)−1;
k=hash (k1∥k2).

Here, 'y' is the service provider's new short-term private encryption key, and 'X' is the new received short-term public encryption key generated by the user. The value 'b' is the service provider's existing long-term private encryption key, and 'A' is the user's existing long-term public encryption key.

The value 'k' represents the master key for the service offering (step 464). This will be used for encrypting all data between the service offering and the user. The value 'k' is a combination of the intermediate keys 'k1' (based on the new short-term encryption keys) and 'k2' (based on the long-term encryption keys). The calculation of 'k' is not directly dependent on the original shared secret 's', but the values 'A' and 'b' carry some of the authentication originally provided by 's'. A check can be made on the intermediate key values of k1 and k2 (step 466) to verify that these two values are not 0, 1 or order(G)−1; otherwise it could mean there is a security attack being attempted. If k1 or k2 do fall into one of these small subset groups the negotiation for a key can be aborted (step 468).

If a subset attack is not detected, the master key 'k' can be used to test the key confirmation value sent by the user. One method for generating a key confirmation value is to hash the key with a known string like the bytes in the public key "B" (step 470). This calculation can be similar to those already described. The service offering would then transmit its new short-term public encryption key 'Y' and the key confirmation value $h_B$ to the user (step 472). This transfer of the key values and the key confirmation value is shown at transfer box (E) in FIG. 9.

Once the user has generated its own master key 'k', it sends back a final key confirmation value to ensure the service offering knows that everything has worked correctly (step 454 of FIG. 8) as shown at (F). This final step at (F) is shown in FIG. 9 as an input to the service offering. If the final key confirmation value was calculated for 'A' and sent to the service offering (step 474), then this is what the test looks for (step 476). If the final key confirmation value does not match the expected value the operation is aborted (step 478). If the final key confirmation value verifies, then it is assumed that a full two-way encrypted and secure data communication path exists (step 480). The server keeps the previous key for several minutes just in case packets were on route during this new key generation stage (step 480).

According to another aspect, any form of computer readable carrier can contain processing instructions adapted to a cause a processing unit to execute the methods described herein. The computer readable carrier can be any suitable type of carrier, such as solid-state memory (e.g., read only memory (ROM), random access memory (RAM), etc.), magnetic memory, optical memory, other type of memory, or modulated waves/signals (such as radio frequency, audio frequency, or optical frequency modulated waves/signals) containing an appropriate set of computer instructions that would cause a processing unit to carry out the techniques described herein.

A computer readable carrier may be used with the systems and methods disclosed herein. For example, a computer readable carrier may be used in connection with password-based encryption communication system, in wireless or wired environments, having perfect forward secrecy is described. This example system includes using a long-term generated key-pair in combination with a short-term authentication key-pair, generated using a shared secret, to allow for the implementation of perfect forward secrecy. The long-term public key is piggy-backed with the authentication public key to enable an authentic exchange of long-term keys. This enables the corresponding party that is in possession of the shared secret, to receive and be able to use the long-term public key.

As another example, a carrier can be used with a method carried out by a first system for establishing a secure bidirectional communication path between the first system and a second system for an exchange of one or more messages is described. The method comprises generating a first key pair having a first public key and a first private key, and generating a second key pair having a second public key and a second private key. The second public key is generated based upon a shared secret known to the first system and the second system. The method also comprises sending the second public key and the first public key to the second system, and receiving a third public key and a fourth public key generated by the second system, wherein the fourth public key is generated based upon the shared secret. The method also comprises calculating a master key based upon the first private key, the second private key, the third public key and the fourth public key, wherein the master key is configured to be used in encryption of one or more messages.

Having described in detail the exemplary embodiments of the present invention, including exemplary methods of operation, it is to be understood that the operations described herein could be carried out with different elements and steps. The exemplary embodiments are presented only by way of example and are not meant to limit the scope of the present invention, which is defined by claims.

What is claimed:

1. A key agreement method carried out by a first system in conjunction with a second system over a bidirectional communication path between the first system and the second system, the method comprising:

generating a first key pair having a first public key and a first private key;
sending the first public key to the second system;
receiving a second public key generated by the second system; and
calculating a master key based upon the first private key, the second public key, a long-term private key, and a long-term public key,
wherein the long-term private key was generated by the first system during a previous key-agreement method as part of a long-term key pair,
wherein the long-term public key was generated by the second system and was received during the previous key-agreement method,
wherein the previous key-agreement method required a secret to be known to the first system and to the second system, thus conferring authentication based on the secret to the long-term public key, and
wherein the first public key, the second public key, the long-term public key, and a public key of the long-term key pair are all independent of the secret.

2. The method of claim 1, wherein calculating the master key comprises:
calculating a first value based upon the first private key and the second public key;
calculating a second value based upon the long-term private key and the long-term public key;
creating a concatenation of the first value with the second value; and
calculating the master key as a hash of the concatenation.

3. The method of claim 1, further comprising:
receiving from the second system a key confirmation value generated by the second system in a known manner using what the second system considers to be the master key;
calculating a value in the known manner using the master key; and
where the calculated value is identical to the key confirmation value received from the second system, determining that the second system is in possession of the master key.

4. The method of claim 1, further comprising using the master key to encrypt one or more messages to be exchanged between the first system and the second system over the bidirectional communication path.

5. The method of claim 4, wherein the messages comprise one or more e-mail messages, http-based XML messages, or http-based WML messages.

6. The method of claim 4, wherein the first system and the second system are addressed with e-mail addresses or IP addresses.

7. The method of claim 1, wherein one of the first system and the second system comprises a wireless mobile device.

8. The method of claim 7, wherein the other of the first system and the second system comprises a wireless mobile device.

9. The method of claim 7, wherein the other of the first system and the second system comprises a host system offering services.

10. The method of claim 1, wherein one of the first system and the second system comprises a host system offering services.

11. The method of claim 10, wherein the secret comprises a personal identification number (PIN) automatically generated by the host system.

12. The method of claim 1, wherein the secret is communicated over a secure out-of-band channel.

13. The method of claim 12, wherein the secret is received from the second system through a web interface following a request by the first system.

14. The method of claim 1, wherein the secret is communicated between the first system and the second system indirectly through an intermediary.

15. The method of claim 1, wherein the secret is unique to the communications between the first system and the second system.

16. A first system for carrying out a key agreement method in conjunction with a second system over a bidirectional communication path between the first system and the second system, comprising:
   means for generating a first key pair having a first public key and a first private key;
   means for sending the first public key to the second system;
   means for calculating a master key based upon the first private key, the second public key, a long-term private key, and a long-term public key,
   wherein the long-term private key was generated by the first system during a previous key-agreement method as part of a long-term key pair,
   wherein the long-term public key was generated by the second system and was received during the previous key-agreement method,
   wherein the previous key-agreement method required a secret to be known to the first system and to the second system, thus conferring authentication based on the secret to the long-term public key, and
   wherein the first public key, the second public key, the long-term public key, and a public key of the long-term key pair are all independent of the secret.

17. The first system of claim 16, wherein the means for calculating the master key comprises:
   means for calculating a first value based upon the first private key and the second public key;
   means for calculating a second value based upon the long-term private key and the long-term public key;
   means for creating a concatenation of the first value with the second value; and
   means for calculating the master key as a hash of the concatenation.

18. A first system, comprising:
   a memory; and
   a processing unit coupled to the memory, wherein the processing unit is configured to carry out a key agreement method in conjunction with a second system by:
      generating a first key pair having a first public key and a first private key;
      sending the first public key to the second system;
      receiving a second public key generated by the second system; and
      calculating a master key based upon the first private key, the second public key, a long-term private key, and a long-term public key,
      wherein the long-term private key was generated by the first system during a previous key-agreement method as part of a long-term key pair,
      wherein the long-term public key was generated by the second system and was received during the previous key-agreement method,
      wherein the previous key-agreement method required a secret to be known to the first system and to the second system, thus conferring authentication based on the secret to the long-term public key, and
      wherein the first public key, the second public key, the long-term public key, and a public key of the long-term key pair are all independent of the secret.

19. The first system of claim 18, wherein the processing unit is further configured to calculate the master key by:
   calculating a first value based upon the third private key and the fourth public key;
   calculating a second value based upon the first long-term private key and the second long-term public key;
   creating a concatenation of the first value with the second value; and
   calculating the master key as a hash of the concatenation.

20. Computer-readable non-transitory storage medium or mediums encoded with instructions that cause a device with a processor to perform a key agreement method carried out by a first system in conjunction with a second system over a bidirectional communication path between the first system and the second system, said method comprising:
   generating a first key pair having a first public key and a first private key;
   sending the first public key to the second system;
   receiving a second public key generated by the second system; and
   calculating a master key based upon the first private key, the second public key, a long-term private key, and a long-term public key,
   wherein the long-term private key was generated by the first system during a previous key-agreement method as part of a long-term key pair,
   wherein the long-term public key was generated by the second system and was received during the previous key-agreement method,
   wherein the previous key-agreement method required a secret to be known to the first system and to the second system, thus conferring authentication based on the secret to the long-term public key, and
   wherein the first public key, the second public key, the long-term public key, and a public key of the long-term key pair are all independent of the secret.

21. Computer-readable non-transitory storage medium or mediums of claim 20, wherein calculating the master key comprises:
   calculating a first value based upon the third private key and the fourth public key;
   calculating a second value based upon the first long-term private key and the second long-term public key;
   creating a concatenation of the first value with the second value; and
   calculating the master key as a hash of the concatenation.

* * * * *